United States Patent [19]

Lund

[11] 4,070,855

[45] Jan. 31, 1978

[54] CONSTANT FORCE MOTOR

[76] Inventor: Roy F. Lund, Tanglewood Box 24K, R.D. #5, Muncy, Pa. 17756

[21] Appl. No.: 666,369

[22] Filed: Mar. 12, 1976

[51] Int. Cl.² .............................................. F03G 3/00
[52] U.S. Cl. ..................................... 60/407; 60/370; 60/721; 185/4; 185/27
[58] Field of Search ................ 60/407, 409, 410, 412, 60/721, 370; 185/4, 6, 27, 32; 74/84, 87

[56] References Cited

U.S. PATENT DOCUMENTS

3,750,484   8/1973   Benjamin ........................... 60/721 X

Primary Examiner—Allen M. Ostrager
Attorney, Agent, or Firm—Sughrue, Rothwell, Mion, Zinn and Macpeak

[57] ABSTRACT

A plurality of translation rods are mounted in a cage for pivoting about a common axis and pass through the pivot axis, being at fixed circumferentially spaced positions but movable bidirectionally along their individual axes during rotation about the fixed axis shaft. Cam follower rods pivotably mounted on respective ends of the translation rods are slidable axially relative to their axis and through their pivot axis. The cam follower rods carry rotatable cam followers through tension springs, which normally maintain the cam followers at a predetermined distance from the cam follower rod pivot axis in the absence of cam follower contact with a fixed cam mounted in juxtaposition to the path of the rotation of the translation rods. The major surface of the fixed cam is generally at right angles to the direction of constant forces applied to respective ends of each translation rod. These constant forces applied at the ends of each translation rod, acting in a given fixed direction and in the plane of rod rotation about the common pivot axis, cause the series of translation rods by force imbalance to rotate, thereby moving cam followers on the ends of the cam follower rods periodically into contact with the cams and cause the translation rod to translate while storing and negating a portion of the energy obtained from the forces applied at the translation rod ends during a portion of each rod rotation by extending the springs, thus a torque is generated which rotates the translation rods continuously in a given direction about the common pivot axis. Reciprocating pistons subject on one side to a constant pressure fluid constitute the constant force applying devices for the translation rods.

8 Claims, 16 Drawing Figures

CONSTANT FORCE MOTOR

BACKGROUND OF THE INVENTION

1. Field of the Invention

This invention relates to a mechanism for translating the energy of a constant force means into mechanical rotation, and more particularly, to a constant force motor which operates in response to a force imbalance on a plurality of axially shiftable translation rods mounted for rotation intermediate of their ends.

SUMMARY OF THE INVENTION

The present invention is directed to a simplified mechanism that converts a constant force such as a constant pressure gas acting on a movable piston restrained in its movement so as to produce a force acting constantly in a fixed direction and of essentially constant magnitude as a power source for a motor whose output comprises a rotational driving torque. Particularly, the mechanism responds to an energy source to overcome friction while obtaining cage rotation about the main shaft or like rotary motion as its utilitarian object. The mechanism of the present invention causes no adverse effects upon the surrounding ecology, no waste products are formed, and no appreciable heat is given off as it converts the constant force into usable power.

The present invention advantageously employs as a part of that mechanism springs which follow Hooks' law and have a particular spring constant to cause translation of a plurality of rods rotatable about a common axis and to negate the force imbalance condition on the rods causing rotation and translation movement, to generate a continuous rotation of the assembly of multiple translation rods.

The invention comprises a constant force motor including a plurality of translation rods mounted for pivoting about a common axis which may be vertical or horizontal, the rods rotating at fixed circumferentially spaced positions with respect to each other and slidable bidirectionally along the individual axes during rotation. Stationary cam means mounted in juxtaposition to the path of rotation of the rods are contacted by rotatable cam followers mounted on respective ends of cam follower rods, the cam follower rods are pivotably mounted on respective ends of the translation rods and slidable axially relative to their axes and through the pivot axis of the mounting of the cam follower rods to the translation rods. Springs couple the cam follower rods to the translation rods and normally maintain the cam followers at a predetermined distance from the cam follower rod pivot axis in the absence of contact with the cam, but with cam contact permit, due to the force imbalance acting on the translation rods, shifting of the translation rods axially through the common power axis and storing a return force on the spring. A constant gas pressure acting on a piston at each end of each rod applies constant unidirectional forces acting on the translation rod in a given direction in the plane of translation rod rotation and generally at right angles to the major cam surfaces to cause the series of translation rods by force imbalance to rotate the rods and move the cam followers on the ends of the rods into periodic contact with the cam followers, store energy by expanding the springs, create counter forces thereby, and generate torque to the rods to effect rotation in a given direction about the common pivot axis.

Preferably, springs concentrically surround the cam follower rods and are fixed at one end to the cam follower pivot mount on the end of the translation rod and are fixed at the other end to the cam follower pivot pin at the end of the cam follower rod. A plurality of cage units comprise sets of rods circumferentially spaced about the common pivot axis with the rods of one cage unit being circumferentially offset relative to the rods of the other cages. In the illustrated form, the constant force motor has the common pivot axis vertical and the constant force means comprises pistons fixed to the translation rods at equal distances at respective sides of the common pivot axis and subject to a fixed gas pressure. The configuration of the fixed cam is essentially that of a J lying on its side and having the circular curved end conforming to the common axis of rotation of the translation shafts, with its radius of curvature coincident with the J-shaped cam surface to one side of the common axis of rotation of said translation rods.

BRIEF DESCRIPTION OF THE FIGURES

FIGS. 9-15 are force diagrams pertaining to the calculations defining the theory of operation of the constant force motor of this invention.

DESCRIPTION OF THE PREFERRED EMBODIMENTS

Figure 1:
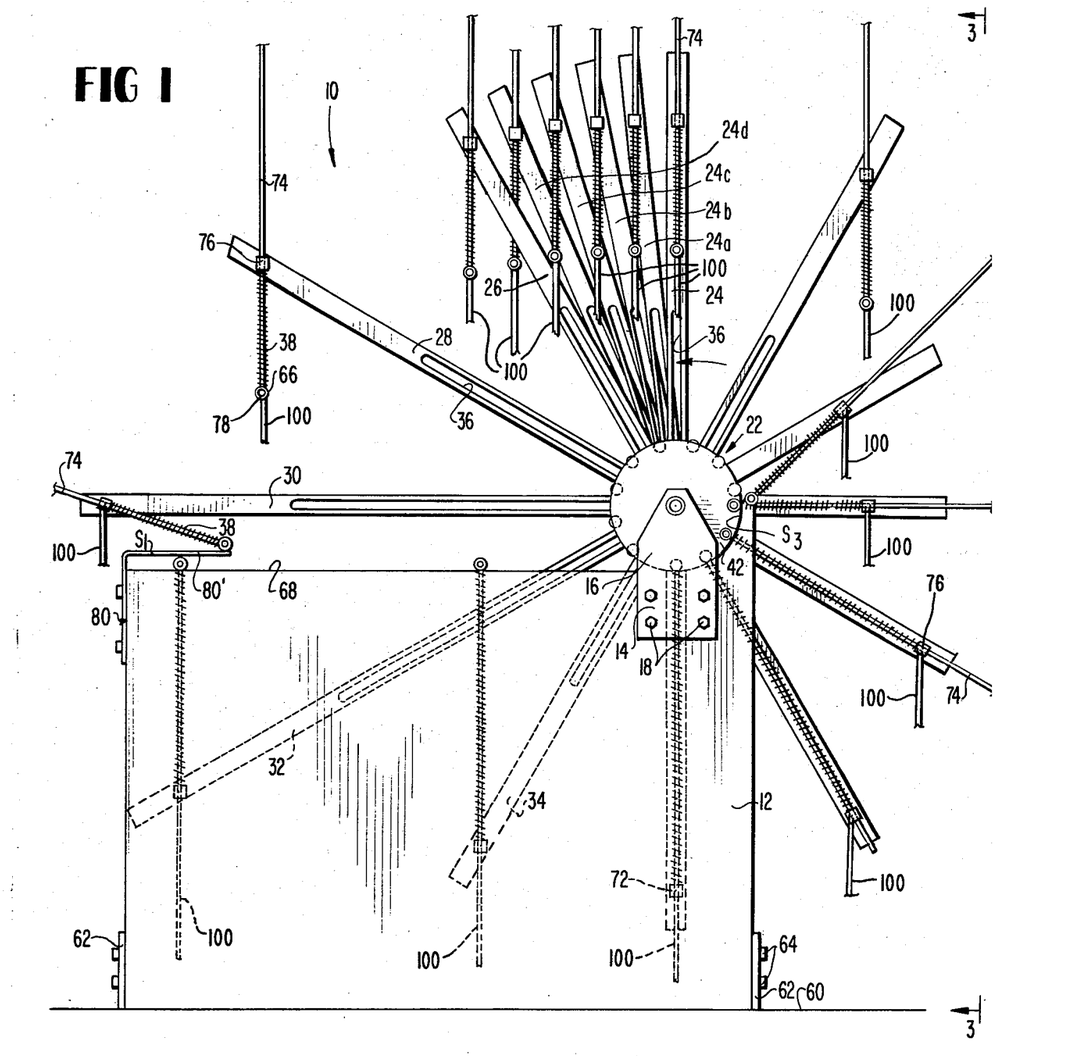
FIG. 1 is a top plan view of a portion of one embodiment of the constant force motor of the present invention illustrating the principles of operation of such motor.

Referring to FIGS. 1-8 inclusive, one embodiment of the constant force motor of the present invention is illustrated generally at 10 and includes cam plate assembly 12. A main stationary shaft 14 is mounted vertically by means of a pair of bracket members 16 and 16', on respective sides of the cam plate assembly 12 and being fixed thereto by suitable bolts as at 18, each bracket supporting the main shaft 14 which is bolted to the brackets. Mounted to shaft 14 on ball bearings for rotation about the shaft axis is a multiple cage unit assembly indicated generally at 22 which functions to support a plurality of translation rods for rotation about the shaft. In the constant force motor of FIG. 1, five rotating cage units A, B, C, D, E, are mechanically joined together. Each unit consists of six translation rods. FIG. 1 illustrates for cage unit A rods at 24, 26, 28, 30, 32 and 34. Rod 24 is at 12 o'clock position at that moment and rotates counterclockwise, per the arrow. Only translation rod 24a of the second cage unit B is illustrated along with and in like fashion for the third, fourth and fifth cage units C, D and E, only rods 24b, 24c and 24d are shown, these rods being slightly angularly offset relative to the related rod 24 and from each other such that the force imbalance acting on the six translation rods of each of the five units will effect not only additive torque causing rotation in this case, of assembly 22 counterclockwise about the axis of the main shaft 14, but an essentially uniform velocity without speed fluctuation. Taking translation rod 28 as an example, the rod is provided with an elongated slot 36 which is of a width so as to freely receive the main shaft 14, FIG. 5. The translation rods are all mounted in the cage for rotation about the shaft 14's axis and for axial translation, that is, movement bidirectionally in a direction of the axes of the translation shafts under the action of force imbalance and that of the stored energy within coil spring or force negating means 38 associated with each translation shaft which performs a negating force function.

Figure 5:
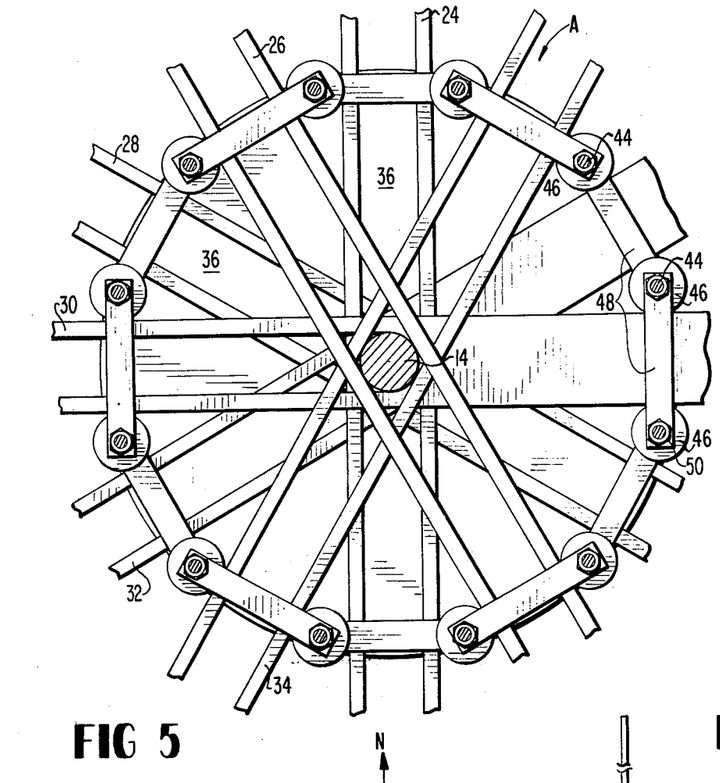
FIG. 5 is an enlarged sectional elevational view of one cage unit of the motor of FIG. 1.
Figure 6:
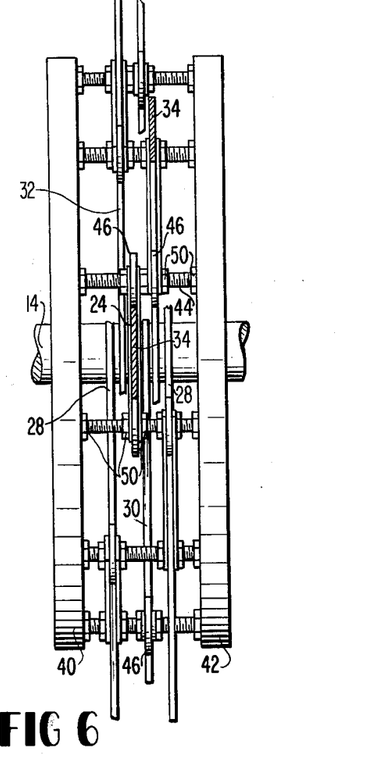
FIG. 6 is an end view of the cage unit of FIG. 5.

Referring to FIGS. 5 and 6, for cage unit A, laterally spaced circular plates 40 and 42 mounted on ball bearings through which pass the main shaft 14, the plates 40 and 42 being rotatable about shaft 14. Threaded bolts as at 44 extend between the plates and mounted thereto are a series of rollers 46. Guide bars 48 extend between rollers 46 and define rectangular slots through which the translation rods extend with the outer edges of the rods riding on the periphery of the rollers 46 such that the translation rods shift bidirectionally along their axes, but are restrained from movement in the direction of the axis of shaft 14 although they rotate about that shaft. Suitable nuts 50 lock the rollers 46 at preferred axial locations with respect to the threaded bolts 44 and facilitate the maintenance of the axially displaced position of the various translation rods relative to the main shaft 14 about which they rotate, restrained by the multiple cage unit assembly 22.

In the illustrated arrangement, each cage unit is constructed to maintain a 30° separation between its translation rods during rotation with the five pinned cage unit assemblies rotating in unison on shaft 14 to form one multiple cage unit assembly 22 mounted as stated previously for rotation about the axis of main shaft 14 by two inch ball bearings in the plates 40 and 42. Within the completed cage unit assembly 22, the individual cage units are angularly shifted by 6° from each other such that all of the rods are oriented angularly at 6° circumferential spacing about the horizontal axis main shaft 14. If desired, the cage end plate such as plate 40 may be provided with gear teeth such that these members provide a ready power output take-off for the constant force motor.

The cam assembly 12 consisting of a plurality of transversely spaced cam members or plates as at 12a, 12b, 12c, 12d, 12e and 12f are mounted to a vertical support 60, by horizontal mounting plates 62 at either end and through the use of bolts 64. The assembly 12 consists of four interior cams of double thickness as compared to end cam plate 12a, these allowing two cam followers 66 to roll without interference next to one another on the cam surfaces of the interior cams, the cam surfaces being coplanar with cam surface 68 illustrated in FIG. 1 at the top of cam plate 12a. The end cam plates 12a and 12f can only accommodate one cam follower 66. As stated previously, brackets 16 and 16' are bolted to the end cam plates and the brackets are adjustable to insure that the main shaft center will be at the intersection of the horizontal and vertical axis of the cam assembly 12.

Each of the translation rods has equal force application means at its opposite ends, defining a translation shaft assembly which further includes cam follower rods 74 mounted to the axes and thus to the translation shafts at their outer ends for sliding motion in a plane parallel to the translation shaft by way of guide blocks 76. One end of a coil spring 38 is fixed to the axis of the guide block 76 and concentrically surrounds cam follower rod 74, while the opposite end is fixed to the cam follower roller pivot block 78, this block supporting a cam follower in the form of a roller 66 for contact with an appropriate cam surface such as cam surface 68 of cam plate 12a, FIG. 1.

Figure 2:
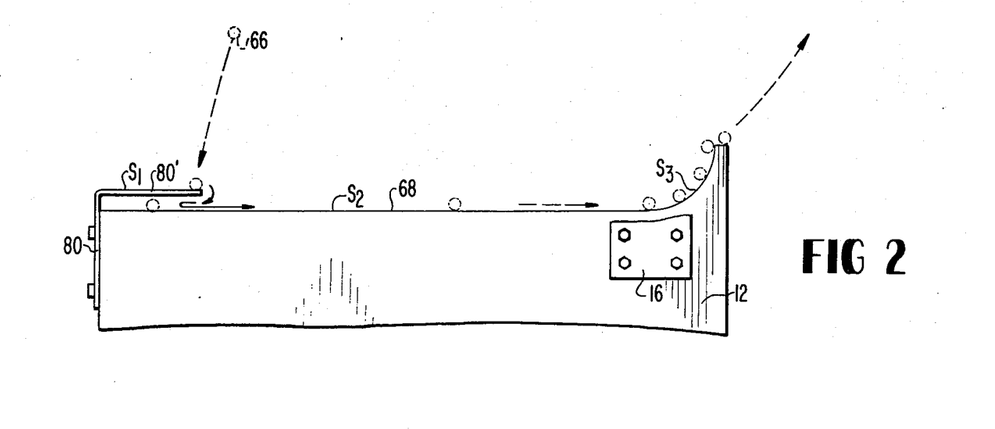
FIG. 2 is a top plan view of one of the cams of the motor of FIG. 1 indicating schematically the sequence of movement of a cam follower carried by a given translation rod of the constant force motor of FIG. 1.
Figure 3:
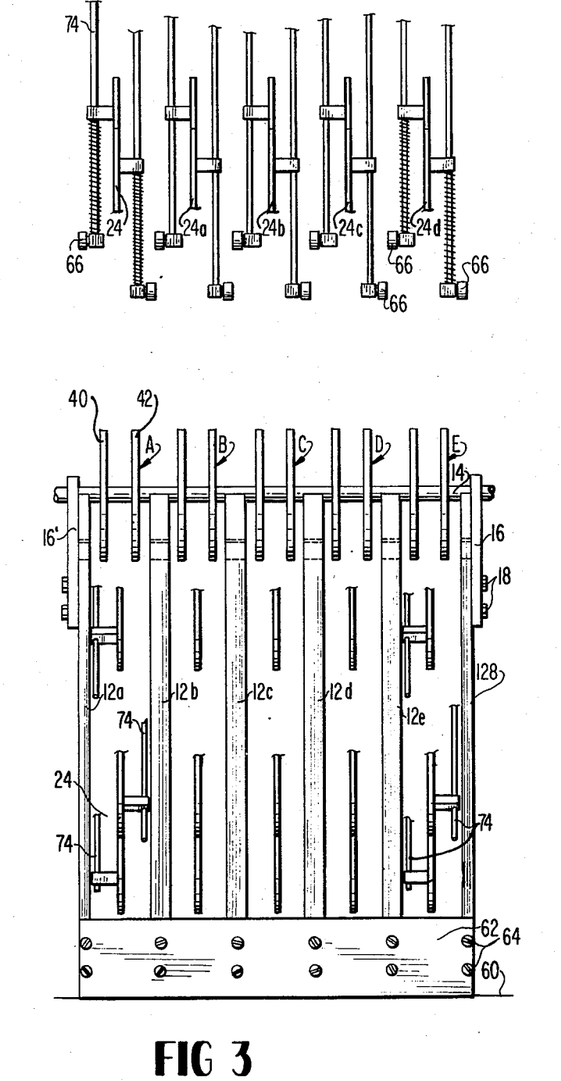
FIG. 3 is a side elevational view, partially broken away, of the constant force motor of FIG. 1.
Figure 4:
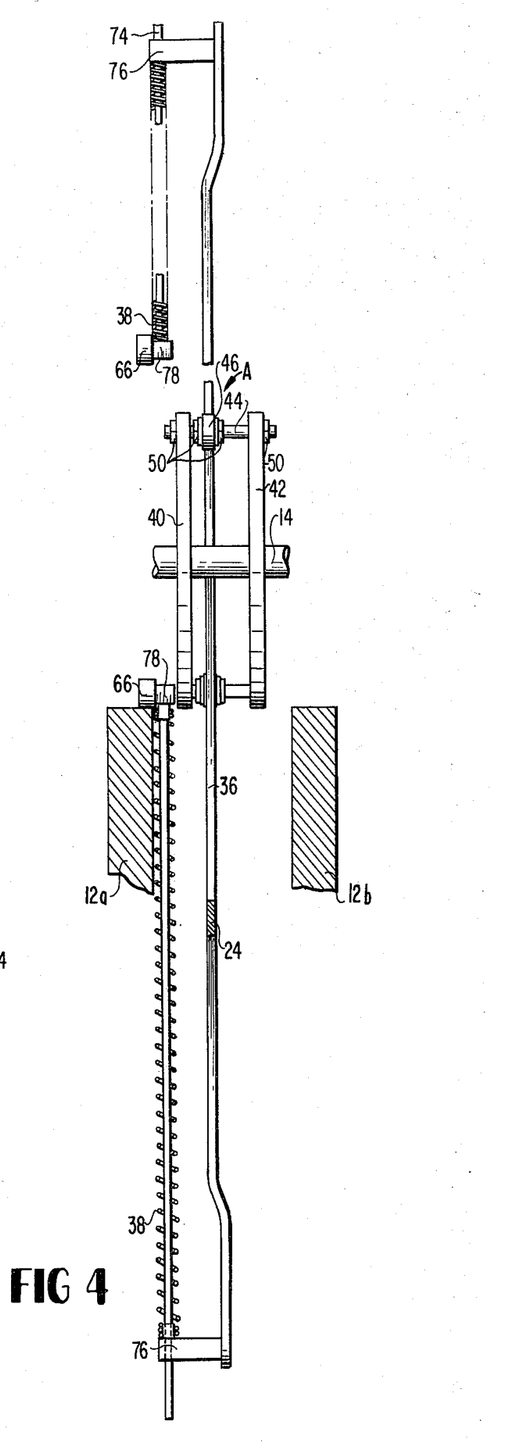
FIG. 4 is an enlarged side elevational view of a portion of the constant force motor of FIG. 1 illustrating the make-up and manner of operation of one of the translation rods for one of the cage units.

The effect of this assembly is to permit the cam follower rods 74 to slide axially in block 76, the block 76 being mounted for rotation about the ends of the translation rods 28. In this case, where the constant force motor comprises pistons subjected to a fixed gas pressure, upon leaving cam surface 68, the cam follower rod rotates to the 12 o'clock position as seen in FIG. 1 prior to contact again by the follower 66 extension cam surface $S_1$ defined by an L-shaped plate mounted to one end of the cam assembly 12 and having a portion 80' extending vertically and paced slightly above cam surface 68 toward the multiple cage unit assembly 22. The cam surface of each of the cams in the embodiment of FIG. 1 comprises initial contact surface $S_1$ formed by the plate 80, a cam surface portion $S_2$ which extends for a portion of its extent beneath surface $S_1$ to permit a cam follower 66 on a succeeding translation rod to move into a position where it does not interfere with the movement of a cam follower 66 of a preceding translation shaft which follower first moves underneath the plate portion 80' and then towards the axis of rotation of the main shaft 20 as seen in the sequence of FIG. 2. The cam surface terminates at its right hand end, FIG. 2, in a curved surface portion $S_3$ which has a radius of curvature coincident with the axis of main shaft 14.

While it is true that in assembling the motor the individual translation rod assemblies to the multiple cage unit assembly 22, that certain of the cam followers, the cam follower shafts and the springs will be remote from the cam assembly 12, the followers on the opposite ends of the same translation rods of course will be in contact with the cam surface portions $S_1$, $S_2$ and $S_3$, and it will be necessary to effect the desired rotation in a given direction to set the rods at positions where a force imbalance is set up. During this set up, means (not shown) are employed for restraining the rods temporarily from rotation about the axis of main shaft 14 since there are five sets of six rods a piece, that is, 30 rods in all, and each has two cam followers 66 and associated springs 38, all thirty translation rods must be set up prior to release of the multiple cage unit assembly 22 for self rotation about the axis of main shaft 14.

Under operation of the mechanism, each of the thirty rods of the assembly contributes positive torque to the system, part of which is useful power output for approximately 114° for each 180° of simultaneous rotation and translation of the rods. For the remaining 66° of rotation of each 180° of travel, the rod develops a negative torque. Therefore, no individual translation rod isolated from the other members of the system can effect rotation, since it reaches a point where the negative torque would in fact tend to rotate the rod in the opposite direction. While six translation rods are illustrated for each cage unit, with three or four rods for an isolated cage unit, the unit would oscillate but not rotate continuously in a given direction under an applied constant force. By the employment of the five cage units, and the obtaining of useful additive torque through translation rods 24a, 24b, 24c, and 24d, etc., in addition to rod 24 for a given 30° between translation rods of the same unit, the torque developed in the aggregate is always positive and a useful amount of power is available. The output torque fluctuates from a specific low value to a high value approximately three times as great during each 180° of revolution. By coupling the five cage unit assemblies, each containing six rotating and translating rods, the usable power of the output torque is essentially constant within one percent and is five times as great as the amount derived from a single cage unit assembly. Preferably, the translation rods and the elements of the cam followers, the springs, and the cam follower rods are made from low specific gravity material, in the illustrated embodiment of the invention, in FIG. 1, the distance between the block 76 for the sliding cam follower rod 74, and the cam follower support shaft 78 is ten inches, as is the length of the coil of coil spring 38 under relaxed conditions when no stress is applied to the spring to cause it to expand. With a load of 2W (2 arbitrary force units) applied to the ends of both springs from the spring holes, both springs will elongate fifteen inches, and the explanation of the operating principles of the mechanism depicted herein both springs working in conjunction are treated as a single spring with a spring constant of 15 inches of elongation per applied load of 2W.

During operation of the constant force motor 10, the translation rods freely rotate about the vertical axis of the main shaft 14 and translate perpendicularly along the shaft a maximum of 15 inches in either direction from center, but are restrained from motion laterally or in the direction of the axis of the main shaft by the cage assembly unit 22. In one example, the translation rod length is 60 inches.

In the subsequent description of the theory of operation and the mathematical calculations to show the additive positive torques overcome the effect of the negative torques acting on the translation rods during cyclic rotation, the friction derived from the motion of the cam followers on the cam surfaces and the effect of friction between the rods and the main shaft during rod rotation and the translation movement relative to the guide rollers of the multiple cage unit assembly 22, are considered as relatively small and the effects are ignored in the calculations. Weights of moving components of the mechanism other than the constant force, in each instance, of the translation rod assemblies are not mathematically taken into account, and it is believed that the distribution of these weight components during rotation of the mechanism probably have little or no negative effect.

During operation, all translation rods of the mechanism follow the same motion path during rotation about the main shaft axis. The positive or negative torque contribution of each rod at intervals of 3° during rotation have been calculated. The algebraic sum of these contributions are summed to show the total and average power derived from the mechanism. Rotation of the mechanism is illustrated as being counterclockwise in terms of the view of FIG. 1, with the circular quadrant or curved cam surface portion $S_3$ of the cam surface being to the right, the angles $\phi_A$ from 0° to 90° are used to designate the position of a translation rod moving from one position to a right angle position with respect thereto which has its position governed by the springs acting through the cam followers which are moving along the circular quadrant or surface $S_3$ of cam assembly 12. From $\phi_A = 0°$ to 90°, the active spring 38 is under tension along its axis due to the forces 70 and 72 on the translation rods, at $\phi_A = 0$, the stress on the spring is 2W, at $\phi_A = 90°$, the stress on the spring is 0. At angles between 0° and 90°, the spring is always positioned at some radial distance from the axis of the main shaft 14 and the stress on the spring is 2W $\cos\phi_A$, (see FIG. 9).

Since the constant of the spring is 15 inches of elongation for an applied load of 2W, and since the load acting on the spring is 2W $\cos\phi_A$ from $\phi_A = 0°$ to 90°, the position of the rod, relative to its center, on the main axis is a function of the angle $\phi_A$. Because the torque tending to rotate the rod is a function of the rod position relative to the main shaft axis, the torque also is a function of the angle $\phi_A$. Between $\phi_A = 0°$ and 90°, the active spring is always stretched radially along the axis of the rod. The distance of the rod end from the pivot axis is equal to 5 from the axis to cam surface plus 10, the length of the unelongated spring, plus Y, the elongation of the spring due to the stress on the spring. As the total distance along the rod axis is limited by design to 60, the position of the pistons subjected to gas pressure, on both ends of the rod for any angle of rotation between 0° and 90° is dependent upon the angle, and is readily determined (see FIG. 10).

Figures 9, 10, 11, 12, 12A:
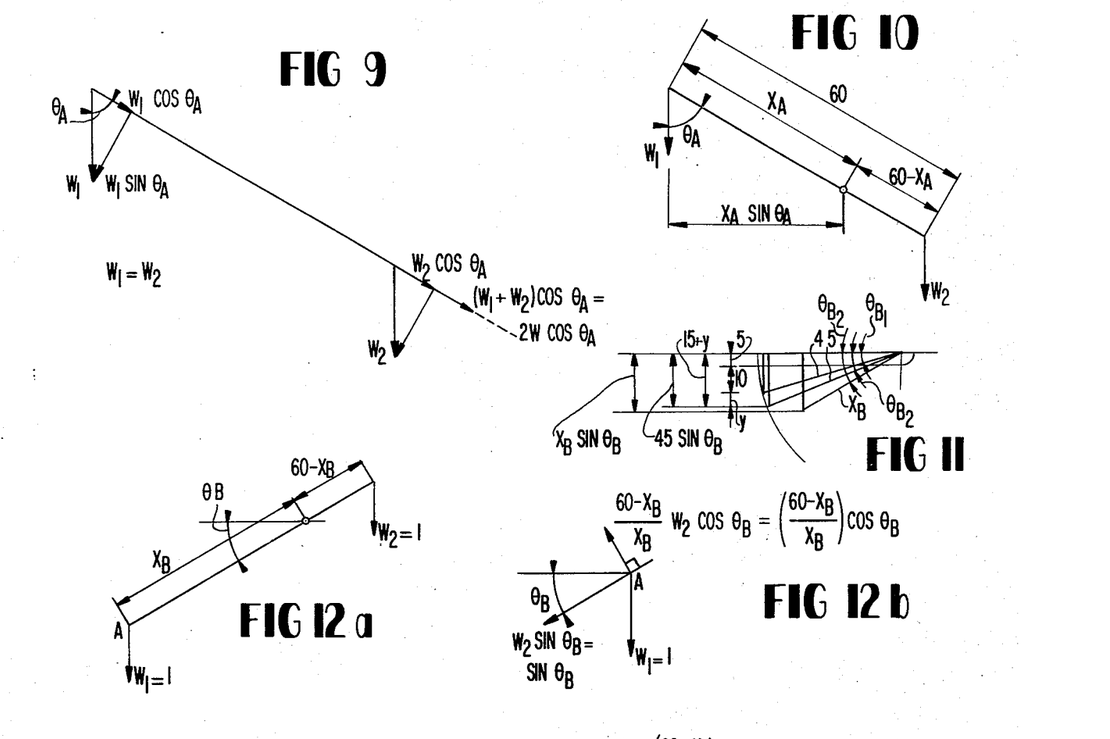

Y = applied stress × spring constant = 2W $\cos\phi_A$ × 15/2

But: W = 1 (arbitrary force unit). Therefore Y = 15 $\cos\phi_A$. If $X_A$ = the length of the portion of the rod above the horizontal axis, then: $60 - X_A = 15 + Y = 15 + 15 \cos\phi_A$. Therefore: $X_A = 60 - 15 - 15 \cos\phi_A = 45 - 15 \cos\phi_A$. The torque about the axis is equal to the arm × weight.

Torque = $W_1 \times X_A \sin\phi_A - W_2 \times (60 - X_A) \sin\phi_A$. But: $W_1 = W_2 = 1$. Therefore, torque, $T = X_A \sin\phi_A - (60 - X_A) \sin\phi_A$.

From the above:

$T = (45 - 15 \cos\phi_A) \sin\phi_A - (15 + 15 \cos\phi_A) \sin\phi_A$ $T = 45 \sin\phi_A - 15 \sin\phi_A \cos\phi_A - 15 \sin\phi_A - 15 \sin\phi_A \cos\phi_A$ $T = 30 \sin\phi_A - 30 \sin\phi_A \cos\phi_A$ $T = 30 \sin\phi_A (1 - \cos\phi_A)$ Values for the torque generated, T, are listed in Table 1

Table 1

| Angle of Rotation $\theta_A$ | Torque $30 \sin\theta_A (1-\cos\theta_A) = T$ |
| --- | --- |
| 0 | 0.00000 |
| 3 | 0.00215 |
| 6 | 0.01718 |
| 9 | 0.05778 |
| 12 | 0.13630 |
| 15 | 0.26457 |
| 18 | 0.45373 |
| 21 | 0.71408 |

Table 1-continued

| Angle of Rotation $\theta_A$ | Torque $30 \sin\theta_A (1-\cos\theta_A) = T$ |
|---|---|
| 24 | 1.05493 |
| 27 | 1.48446 |
| 30 | 2.00962 |
| 33 | 2.63599 |
| 36 | 3.36771 |
| 39 | 4.20740 |
| 42 | 5.15609 |
| 45 | 6.21320 |
| 48 | 7.37652 |
| 51 | 8.64216 |
| 54 | 10.00466 |
| 57 | 11.45694 |
| 60 | 12.99038 |
| 63 | 14.59494 |
| 66 | 16.25919 |
| 69 | 17.97045 |
| 72 | 19.71492 |
| 75 | 21.47777 |
| 78 | 23.24338 |
| 81 | 24.99540 |
| 84 | 26.71698 |
| 87 | 28.39096 |
| 90 | 30.00000 |

Let $y$ = the length of the spring extension, due to its elongation from an applied load due to the piston forces = $F_{W-W_V}$. The cam follower at the end of the spring traverses a path 5 inches below (0) axis. From the rod end center to the cam follower center of the translating rod and cam follower spring assembly, FIG. 1, with no load on the spring, the distance is 10 inches. Therefore, the length from the (0) axis to the center of the bearing in the end of the rod with no load on the spring is 15 inches. Therefore, as the rod is restrained from translating beyond 45 inches by the rod slot, from $\phi_B = 0°$ to $\phi_B = \phi_{B1}$, the rod rotates at a constant length of 45 inches until $X_B \sin\phi_{B1} = 15$. As $X_B = 45$, therefore $\sin^{-1}\phi_{B1} = 15/45$, and therefore $\phi_{B1} = 19.47122°$.

From $\phi_B = \phi_{B1} = 19.47122°$ to $\phi_B = \phi_{B2}$, which is the angle at which the load due to the piston forces on the rod ends, $F_{W-W_V}$, = the force of the spring due to its elongation, $F_{SV}$, $X_B$ continues to = 45, but the driving force, $F_{W-W_V}$, is diminished by the spring force, $F_{SV}$, to the point where both forces are equal. Therefore, when $\phi_B$ is equal to $\phi_{B2}$, $F_{W-W_V} = F_{SV}$. From the diagram, FIG. 11:

$$X_B \sin\phi_B = 5 + 10 + y, \text{ where } y = \text{spring elongation}$$

Figures 12, 12C, 13:
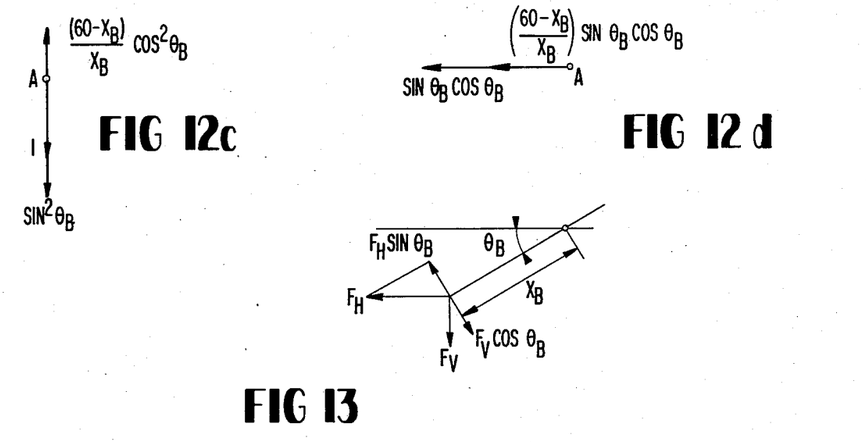

A 60 inch long rod, supported on a vertical axis off its center as shown in FIG. 12a, and which is subjected to gas pressure piston carried forces on both ends with forces equal to one arbitrary forces unit ($W_1 = W_2 = 1$) has forces acting on point A, the lower end of the rod as follows:

The force $W_1$ plus the force along its axis due to $W_2$ which = $W_2 \sin\phi_B = \sin\phi_B$ plus a force perpendicular to the rod axis at point A due to the lever action of $W_2$ which equals the force due to $W_2$ perpendicular to the rod axis times the ratio of the distance from the origin to the application of $W_2$ to the distance from the origin to the point A, or $= (60 - X_B)/X_B \times \cos\phi_B$. These forces are depicted in FIG. 12b. The components at point A of these forces are shown in FIG. 12c, and when algebraically added determine the value of the load forces due to the gas pressures acting on point A and are designated as $F_{W-W_V}$ and equal $1 + \sin^2\phi_B - (60-X_B)\cos^2\phi_B/X_B$ Therefore:

$$F_{W-W_V} = 1 + \sin^2\phi_B - (60/X_B)\cos^2\phi_B + (X_B/X_B)\cos^2\phi_B$$

$$F_{W-W_V} = 1 + \sin^2\phi_B - (60/X_B)\cos^2\phi_B + \cos^2\phi_B = 2 - (60/X_B)\cos^2\phi_B$$

The components at point A of these forces are shown in FIG. 12d, and when algebraically added, determine the value of the load forces due to the gas pressure induced forces acting on point A and are designated as $F_{W-W_H}$ and equal $\sin\phi_B \cos\phi_B + [(60-X_B)\sin\phi_B \cos\phi_B]/X_B$.

Therefore:

$$F_{W-W_H} = \sin\phi_B \cos\phi_B + (60/X_B)\sin\phi_B \cos\phi_B - (X_B/X_B)\sin\phi_B \cos\phi_B$$

$$F_{W-W_H} = \sin\phi_B \cos\phi_B + (60/X_B)\sin\phi_B \cos\phi_B - \sin\phi_B \cos\phi_B = (60/X_B)\sin\phi_B \cos\phi_B$$

Now $y$ in the equation on page 15, line 12, is equal to the load on the spring times the spring constant: $y = F_{W-W_V}(15/2)$ $$y = (2 - (60/X_B)\cos^2\phi_B) 15/2 \text{ and } X_B = 45$$

Therefore:

$$45\sin\phi_B = 5 + 10 + 15 - (450/X_B)\cos^2\phi_B = 30 - 10\cos^2\phi_B$$

As $\cos^2 Z = 1 - \sin^2 Z$,
$$45\sin\phi_B = 30 - 10 + 10\sin^2\phi_B = 20 + 10\sin^2\phi_B$$

$$10\sin^2\phi_B - 45\sin\phi_B + 20 = 0 \text{ or } \sin^2\phi_B - 4.5\sin\phi_B + 2 = 0$$

Therefore:

$$\sin\theta_B = \frac{4.5 \pm \sqrt{(4.5)^2 - 8}}{2} = .50000$$

$$\theta_B = 30.00000°$$

Between $\phi_B = \phi_{B2} = 30.00000°$ and $\phi_B = 90°$, from FIG. 11, $$X_B \sin\phi_B = 5 + 10 + y, \text{ but } y = 15/2(2 - 60/X_B \cos^2\phi_B) = 15 = 450/X_B \cos^2\phi_B$$

Therefore:

$$X_B \sin\phi_B = 15 + 15 - 450/X_B \cos^2\phi_B$$

$$X_B^2 \sin\theta_B - 30X_B + 450 \cos^2\theta_B = 0$$

$$X_B = \frac{30 \pm \sqrt{(30)^2 - (4)450 \sin\theta_B \cos^2\theta_B}}{2\sin\theta_B} =$$

$$\frac{30 \pm \sqrt{900 - 1800\sin\theta_B \cos^2\theta_B}}{2\sin\theta_B}$$

Values of the length of $X_B$, the distance from the vertical axis to the rod end at the active spring end are given in Table 3.

Table 3

| Angle of Rotation $\theta_B$ | Distance from Vertical Axis to Rod End at: | | Angle of Rotation $\theta_B$ | Distance from Vertical Axis to Rod End at: | |
|---|---|---|---|---|---|
| | Active Spring End $X_B$ | Passive Spring End $60 - X_B$ | | Active Spring End $X_B$ | Passive Spring End $60 - X_B$ |
| 0 | 45.00000 | 15.00000 | 48 | 31.85900 | 28.14100 |
| 3 | 45.00000 | 15.00000 | 51 | 31.26875 | 28.73125 |
| 6 | 45.00000 | 15.00000 | 54 | 30.85347 | 29.14653 |
| 9 | 45.00000 | 15.00000 | 57 | 30.56329 | 29.43671 |
| 12 | 45.00000 | 15.00000 | 60 | 30.36260 | 29.63740 |
| 15 | 45.00000 | 15.00000 | 63 | 30.22593 | 29.77407 |
| 18 | 45.00000 | 15.00000 | 66 | 30.13488 | 29.86512 |
| 21 | 45.00000 | 15.00000 | 69 | 30.07610 | 29.92390 |
| 24 | 45.00000 | 15.00000 | 72 | 30.03978 | 29.96022 |
| 27 | 45.00000 | 15.00000 | 75 | 30.01868 | 29.98132 |
| 30 | 45.00000 | 15.00000 | 78 | 30.00749 | 29.99251 |
| 33 | 40.85916 | 19.14084 | 81 | 30.00233 | 29.99767 |
| 36 | 37.77366 | 22.22634 | 84 | 30.00046 | 29.99954 |
| 39 | 35.50809 | 24.49191 | 87 | 30.00003 | 29.99997 |
| 42 | 33.86804 | 26.13196 | 90 | 30.00000 | 30.00000 |
| 45 | 32.69371 | 27.30629 | | | |

Varying torques develop as the rod translates and rotates through the angles $\phi_B = 0°$ to $\phi_B = 90°$. From $\phi_B = \phi_{BO} = 0°$ to $\phi_B = \phi_{B1} = 19.47122°$, $X_B = 45$. Any sum of the forces acting on point A may be divided into its two right angle components. If the force summation at point A is designated F, the one component becomes $F_V$ and the other component $F_H$. The torque at point A is (FIG. 13):

Torque = $T = (F_V\cos\phi_B - F_H\sin\phi_B)X_B$ per FIG. 13.
But:

$$F_V = F_{W-W_V} = 2 - 60/X_B \cos^2\phi_B$$

And:

$$F_H = F_{W-W_H} = 60/X_B \sin\phi_B \cos\phi_B$$

Therefore:

$$T = ((2-60/X_B\cos^2\phi_B)\cos\phi_B - (60/X_B\sin\phi_B\cos\phi_B)\sin\phi_B)X_B$$

$$T = (2\cos\phi_B - 60/X_B\cos^3\phi_B - 60/X_B\sin^2\phi_B\cos\phi_B)X_B$$

$$T = \cos\phi_B(2X_B - 60(\cos^2\phi_B + \sin^2\phi_B))$$

$$T = \cos\phi_B(2X_B - 60) \text{ But } X_B = 45$$

Therefore:

$$T(19.47122°/0°) = \cos\phi_B(90-60) = 30\cos\phi_B$$

The force due to spring elongation is designated as $F_{S_V}$ between $\phi_B = 0°$ to $90°$ as the force is always at right angles to the planar portion of the cam as the cam follower traverses the planar portion of the cam.

From $\phi_B = \phi_{B1} = 19.47122°$ to $\phi_B = \phi_{B2} = 30.00000°$ $$T = (F_V\cos\phi_B - F_H\sin\phi_B)X_B$$

$$F_V = F_{W-W_V} - F_{S_V}; F_H = F_{W-W_H} = 60/X_B\sin\phi_B\cos\phi_B; F_{W-W_V} = 2 - 60/X_B\cos^2\phi_B$$

$F_{S_V}$ = spring constant × elongation = $2/15 y$ = $2/15(X_B\sin\phi_B - 10 - 5)$ $$F_{S_V} = 2X_B/15\sin\phi_B - 2$$

$$T = ((2 - 60/X_B\cos^2\phi_B - 2X_B/15\sin\phi_B + 2)\cos\phi_B - (60/X_B\sin\phi_B\cos\phi_B)\sin\phi_B)X_B$$

$$T = ((4 - 60/X_B\cos^2\phi_B - 2X_B/15\sin\phi_B)\cos\phi_B - 60/X_B\sin^2\phi_B\cos\phi_B)X_B$$

$$T = (4\cos\phi_B - 60/X_B\cos^3\phi_B - 2X_B/15\sin\phi_B\cos\phi_B - 60/X_B\sin^2\phi_B\cos\phi_B)X_B$$

$$T = (4\cos\phi_B - 60/X_B\cos\phi_B(\cos^2\phi_B + \sin^2\phi_B) - 2X_B/15\sin\phi_B\cos\phi_B)X_B$$

$$T = 4X_B\cos\phi_B - 60\cos\phi_B - 2X_B^2/15\sin\phi_B\cos\phi_B;$$ but $X_B = 45$ $$T = 120\cos\phi_B - 270\sin\phi_B\cos\phi_B$$

$$T = 30\cos\phi_B(4 - 9\sin\phi_B); T30.00000°/19.47122° = 30\cos\phi_G(4 - 9\sin\phi_B)$$

From $\phi_B = \phi_{B2} = 30.00000°$ to $\phi_B = \phi_{B3} = 90°$ $$T = (F_V\cos\phi_B - F_H\sin\phi_B)X_B$$

$F_V = F_{W-W_V} - F_{S_V};$ but $F_{W-W_V} = F_{S_V};$ Therefore: $F_V = 0$ $$F_H = F_{W-W_H} = 60/X_B\sin\phi_B\cos\phi_B$$

Therefore:

$$T(30.00000°/90°) = (-60/X_B\sin^2\phi_B\cos\phi_B)X_X = -60\sin^2\phi_B\cos\phi_B$$

Table 3 lists the torque values for a rod traversing the angle $\phi_B$ from 0° to 90°.

Table 4 lists the torque for one rotating unit of six rods with a rod end spaced every 30° about the horizontal axis.

Table 5 lists the torque values for five units coupled together into one power generator as envisioned herein.

Table 3

| Angle of Rotation $\theta_B$ | Equation Used T = | Torque T | Angle of Rotation $\theta_B$ | Equation Used T = | Torque T |
|---|---|---|---|---|---|
| 0 | $30\cos\theta_B$ | 30.00000 | 45 | $-60\sin^2\theta_B\cos\theta_B$ | −21.21320 |
| 3 | " | 29.95889 | 48 | " | −22.17221 |
| 6 | " | 29.83566 | 51 | " | −22.80490 |
| 9 | " | 29.63065 | 54 | " | −23.08263 |
| 12 | " | 29.34443 | 57 | " | −22.98491 |
| 15 | " | 28.97777 | 60 | " | −22.50000 |
| 18 | " | 28.53170 | 63 | " | −21.62518 |
| 19.47122 | " | 28.28427 | 66 | " | −20.36690 |
| 19.47122 | $30\cos\theta_B(4-9\sin\theta_B)$ | 28.28427 | 69 | " | −18.74062 |
| 21 | " | 21.69702 | 72 | " | −16.77051 |
| 24 | " | 9.30090 | 75 | " | −14.48889 |
| 27 | " | −2.29651 | 78 | " | −11.93545 |
| 30 | " | −12.99038 | 81 | " | − 9.15637 |
| 30 | $-60\sin^2\theta_B\cos\theta_B$ | −12.99038 | 84 | " | − 6.20318 |
| 33 | " | −14.92658 | 87 | " | − 3.13156 |
| 36 | " | −16.77051 | 90 | " | 0.00000 |
| 39 | " | −18.46705 | | | |
| 42 | " | −19.96395 | | | |

Table 4

| Angle of Rotation $\theta_A$ & $\theta_B$ | Sum of Torques for 6 Rod Unit (Tables 1 & 3) Rod Ends 30° Apart |
|---|---|
| 0,30,60 | 9.50962 |
| 3,33,63 | 10.64021 |
| 6,36,66 | 12.34233 |
| 9,39,69 | 14.65861 |
| 12,42,72 | 17.61728 |
| 15,45,75 | 21.23122 |
| 18,48,78 | 25.49767 |
| 21,51,81 | 24.08739 |
| 24,54,84 | 17.79166 |
| 27,57,87 | 12.91938 |
| Sum | 166.29537 |
| Average | 16.62954 |
| High | 25.49767 |
| Low | 9.50962 |
| Average/rod | 2.77159 |

Table 5

| Angle of Rotation $\theta_A$ & $\theta_B$ | Sum of Torques for 5 unit (30 Rod) Machine. (Tables 1 and #) Rod Ends 6° Apart |
|---|---|
| 0,6,12 . . . . . 78,84,90 | 82.75856 |
| 3,9,15 . . . . . 75,81,87 | 83.53681 |
| Sum | 166.29537 |
| Average | 83.14769 |
| High | 83.53681 |
| Low | 82.75856 |
| Average/Rod | 2.77159 |

The constant force power generator depicted herein will have available an average of 83.14769W inch force units of torque minus the friction losses with which to perform useful work. A machine with longer rods and larger forces, but built to the same basic design would have many times this torque available with which to perform useful work.

The mathematical work is shown for determining rod end position and torque developed for similar machines that use the same principle but are constructed with a different cam configuration from $\phi_B = 0°$ to 90°. Since the path and torques developed from $\phi_A = 0°$ to 90° are identical in all cases, during the course of the work, only the end values of this portion of the mechanism are used to develop six rod unit torques and five unit machines. Since all angles and lengths of rods from the origin to the rod end in the appendix apply only to the $\phi_B$ angles, the B suffix is dropped in the development work shown from all appliable terms, but it is understood that the B suffix should be added where applicable.

Alternately, cams may be employed having various configurations. For instance, surface $S_1$ may be inclined at an angle B to the horizontal of 11.21227° or less, above this value the equations become imaginary and affect the operation of the motor adversely.

Figure 7:
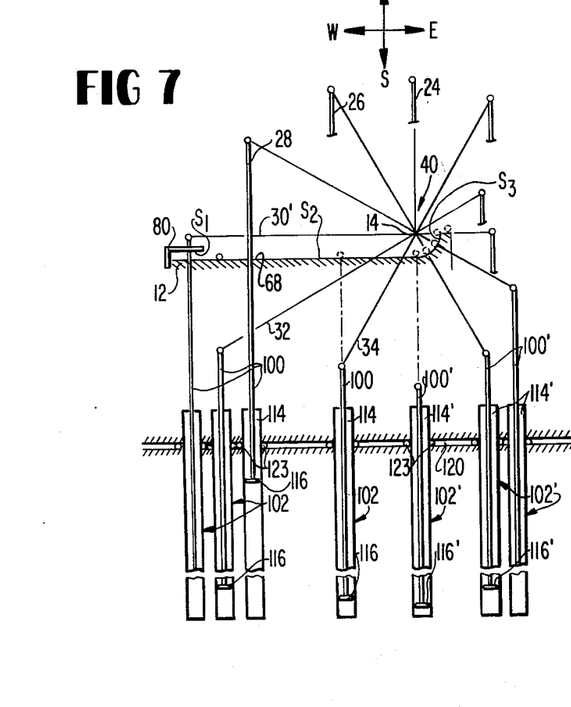
FIG. 7 is a schematic diagram of the constant force motor of the present invention with translation rods pivoting about a vertical axis.
Figure 8:
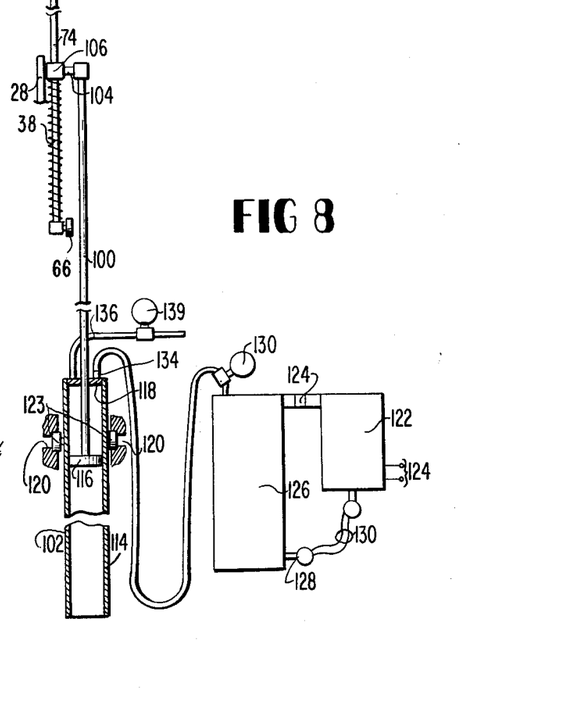
FIG. 8 is a schematic representation the constant force generator forming a part of the illustrated embodiment of the invention.

Referring to FIGS. 7 and 8, the illustrated embodiment of the invention employs the same cam configuration which provides for each translation shaft during its rotation of 360° an additive torque facilitating rotation of the assembly about the vertical axis, the embodiment of the invention employs as its source of constant force for the ends of said translation rods a constant pressure fluid acting on pistons of equal size. A cam plate 12 is schematically illustrated as having a cam surface 68 including a first surface portion $S_1$ formed by 80 which is parallel to surface portion $S_2$ and which is also a straight surface portion, this being joined to a circular quadrant surface portion $S_3$ having it radius of curvature coincident with the horizontal axis of rotation of cage unit assembly indicated schematically at 40 and consisting of six translation rods 24, 26, 28, 30, 32 and 34, as shown of FIGS. 1 and 5. As a result of the force imbalance acting on respective ends of the translation rods 24 through 34 effects an increase in the additive torque tending to rotate the assembly in a continuous counter-clockwise direction as seen by the arrow, FIG. 7.

With respect to the illustrated embodiment of the invention, the present invention employs as the constant force for effecting the translation and rotaion of the multiple sets of circumferentially spaced translation rods is effected by constant force generators which forces are mechanically directed in each case, to respective ends of each translation rod and act in a predetermined direction constantly. The constant force motor main shaft 14 has its axis vertical and wherein mechanical connections are made to the piston rods of given constant force generators at each end of the translation rod.

In the schematic representation of the second embodiment of the invention, FIG. 7, the translation rods are shown as incorporating constant force generators 102 and 102' pivotably mounted by way of piston rods 100 and 100' to the outboard end of rod 26 through hinge blocks. Piston rods 100 and 100' terminate in integral pistons as at 116, 116' mounted for reciprocation within closed end cylinders 114, 114' respectively, the cylinders in turn being mounted for movement at right angles to the axis of the piston rods; that is, by way of horizontal tracks 120 and 120' which are shown in this case extending in excess of the width of the cam plate assembly 12' and beneath and outside of the rotary path of movement of the ends of the various translation rods, requiring that the cylinders 114 and 114' be of an axial length and the piston rods 100 and 100' also be of axial length in excess to the axial length of the translation rods. Thus, by further reference to FIG. 8, it may be seen, therefore, that the constant force is developed on the end of each rod of equal magnitude and acting in a set direction, in this case horizontally, to a plane which intersects the vertical axis of rotation provided by shaft 14 and in a plane parallel to the plane of movement of the translation shafts. While only the force generators 102 and 102' are shown for given rods, each of the translation rods of the illustrated cage unit employ like force generators to provide the constant force needed to effect the desired operation of the motor. The pin connection 104 which connects the guide block 106, FIG. 8, to the underlying translation rod 28 does not affect the nature and operation of the cam follower rod 74, coil spring 38 and cam follower 60, these elements being shown in FIG. 1.

The constant force generator cylinder 114, within which is sealably and slidably mounted piston 116 by way of piston rod 100, has a portion which extends outside of the cylinder 114, closed off at its upper end by cover or end wall 118. Since the pin 104 travels in an irregular, circular path about the pivot axis of the main shaft of the constant force motor in accordance with FIG. 1, it is required only that the constant force acting on the end of the translation shaft 24 through pin 104 be directed along a direction which does not change, corresponding to a north-south axis, for instance, and requiring that the cylinder be free to move in the east-west direction. This is achieved by the use of the pair of fixed tracks 120 upon which the cylinder is mounted for movement by rollers 123 in the direction of the arrow EW, bidirectionally and at right angles to the angle of the applied constant force. The system employs an air compressor, for example, at 122, which compresses air for storage through tube connection 124 to tank 126, the tank 126 having a pressure sensor 128 which controls through wires 130 the energization of compressor 122 from a source 124. A pressure regulator 130 permits compressed air at a fixed pressure to travel through hose 132 which terminates at the upper end of the cylinder 114 by way of a nipple or other suitable connector as at 134. The air is maintained within the interior of the cylinder 114 between the cover 118 and piston 116 at a given air pressure "Z" psi. An exhaust pipe 136 is also connected to cylinder 114 through end wall 118 and carries a pressure relief valve 138 set at the same pressure "Z" as the pressure regulator 130. Thus, as long as the compressor 122 operates, compressed air is stored at a pressure of somewhat slightly more than "Z", i.e., "Z" plus 5 psi, as regulated by sensor 128. However, the pressure passing through the hose 132 from tank 126 is at "Z" psi as regulated by the pressure regulator 130 during movement of the translation shaft pin connected to piston rod 100, the relief valve 138 opens to maintain the pressure at the value "Z", while when the piston moves south, that is, away from end wall 118, the pressure regulator valve 130 opens and the cylinder pressure is maintained at the constant "Z" value. Thus, regardless of the position of piston 116 relative to cylinder 114 in moving towards and away from end wall 118, a constant force is exerted through the piston rod onto the end of the translation rod 28 of a value of "Z" psi times the piston rod area which is equal to F which equals the one arbitrary force unit.

The embodiment of the invention as illustrated in FIG. 8 is schematic, but it is believed that it adequately illustrates the mechanical connection between the constant force generators and the translation rods. It is quite evident that a constant gas pressure acting on a piston of a given area will produce a constant force at each end of the translation rods of the illustrated embodiment of FIG. 1. The nature of operation and the calculations indicative of the creation of additive torques on the various rods of the various unit assemblies effect a constant force motor capable of extended operation under the principles of the utilization of a force created by way of air compressor 122 in the horizontal mode constant force motor.

What is claimed is:
1. A constant force motor comprising in assembly:
    a plurality of translation rods,
    means for mounting said translation rods side by side for pivoting about a common pivot axis at fixed circumferentially spaced positions with respect to each other and for individual translation bidirectionally along their axes during rotation,
    means for limiting translation of said rods through said common pivot axis,
    means for applying equal constant forces on each rod on respective sides of said common pivot axis with said forces acting in the same fixed direction in the plane of rod rotation to cause, in response to rod shifting along its axis to positions other than that where the pivot axis coincides with the center of said rod, a force imbalance causing rod rotation about the common axis and translation thereof along their individual axes, and
    means to negate a portion of the force imbalance acting on said rods during a portion of each rod rotation to thereby cause said assembly to rotate continuously in a given direction by converting unidirectional forces to usable torques.
2. The constant force motor as claimed in claim 1, wherein said force imbalance negate means comprises:
    cam means mounted in juxtaposition to the path of rotation of said translation rods and having at least one portion intersecting the direction of constant force application,
    cam follower rods pivotably mounted on respective ends of said translation rods and slidable axially relative to their axes and through the pivot axis of said cam follower rods to said translation rods,
    cam followers mounted on the end of said cam follower rods and movable into contact with said cam means during translation rod rotation and axial translation of said translation rods, and
    springs coupling said cam follower rods to said translation rods for normally maintaining said cam followers at a predetermined distance from said cam follower rod pivot axis in the absence of contact with said cam means but permitting said translation rods to shift axially through said common pivot axis against the biasing force of said springs to negate applied force by storing energy in said springs.
3. The constant force motor as claimed in claim 2, wherein said cam followers comprise rollers, said springs comprise coil springs concentrically surrounding said cam follower rods, and said coil springs are fixed at one end to blocks pivotably mounted to said translation rods for pivoting about an axis at right angles to the longitudinal axis of said translation rods and said springs are fixed at their opposite ends to pivot pin mounting blocks for said cam follower rollers.

4. The constant force motor as claimed in claim 1, wherein said cam means comprises a plurality of laterally spaced, parallel cam plates, brackets fixed to the outermost plates support a shaft forming said common axis, axially spaced circular plates ball bearing mounted on said shaft and rotatable therewith form a plurality of cages housing equal number sets of translation rods, and wherein the rods of one cage are circumferentially offset relative to the rods of the other cages to balance the torque inputto said cage for rotating the same at a uniform speed in said given direction.

5. The constant force motor as claimed in claim 2, wherein said cam means comprises a plurality of laterally spaced, parallel cam plates, brackets fixed to the outermost plate support a shaft forming said common axis, axially spaced circular plates are ball bearing mounted on said shaft and rotatable therewith to form a plurality of cages housing equal number sets of translation rods, and wherein the rods of one cage are circumferentially offset relative to the rods of the other cages to balance the torque input to said cage for rotating the same at a uniform speed in said given direction.

6. The constant force motor as claimed in claim 3, wherein said cam means comprises a plurality of laterally spaced, parallel cam plates, brackets fixed to the outermost plate support a shaft forming said common axis, axially spaced circular plates are ball bearing mounted on said shaft and rotatable therewith to form a plurality of cages housing equal number sets of translation rods, and wherein the rods of one cage are circumferentially offset relative to the rods of the other cages to balance torque input to said cage for rotating the same at a uniform speed in said given direction.

7. The constant force motor as claimed in claim 1, wherein said means for applying equal constant forces on each of said translation rods at spaced positions on respective sides of said common pivot axis comprises force generators pivotably mounted to said translation rods at points on opposite sides of said common pivot axis, each force generator comprising cylinder means including an end wall mounted for free movement at right angles to the axis of the cylinder means, piston means sealably, slidably carried by said cylinder means and movable axially therein, piston rod means fixed to said piston means and sealably extending through the end of said cylinder means and forming with said cylinder means a closed chamber, means for pivoting pivotably mounting said piston rods at the end opposite said pistons to respective translation rods and means for maintaining gas at a fixed pressure within said cylinder chamber regardless of movement of said pistons such that said pistons move in said fixed direction and deliver constant forces on said rods in said fixed direction regardless of the angle of rotation of said translation rods relative to said common pivot axis.

8. The constant force motor as claimed in claim 7, wherein said constant force generator includes:
   a compressed air storage tank,
   a flexible hose fluid connecting said air storage tank to said cylinder and opening into said cylinder chamber,
   an air compressor operatively coupled to said compressed air storage tank,
   a pressure sensor carried by said compressed air storage tank for sensing the pressure of the air stored therein,
   means responsive to operation of said pressure sensor for energizing said air compressor to increase the pressure within said air storage tank,
   a pressure regulator within said flexible hose intermediate of said air storage tank and said cylinder means for feeding air at a fixed pressure to said cylinder chamber during movement of said piston away from said cylinder end wall,
   a pressure relief valve operatively coupled to and carried by said cylinder and opening to said cylinder chamber for relieving air pressure and maintaining pressure within said chamber during piston movement towards said cylinder end wall equal to that set by said pressure regulator.

* * * * *